Aug. 11, 1964
D. GRANT ETAL
3,144,082
VIBRATION DAMPING MECHANISM
Filed Nov. 13, 1962
2 Sheets-Sheet 1
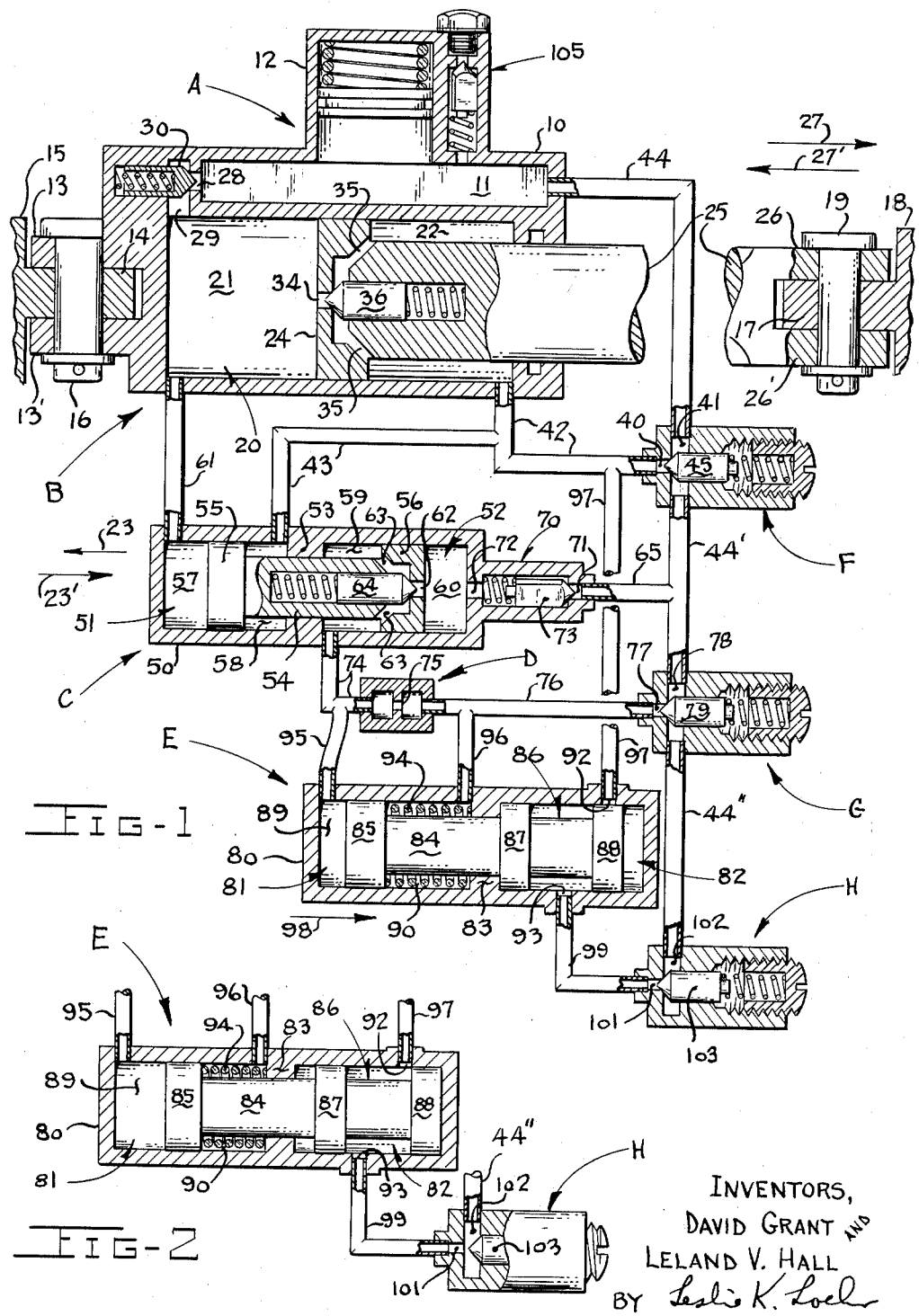
INVENTORS,
DAVID GRANT AND
LELAND V. HALL
BY Leslie K. Loehr
THEIR AGENT.

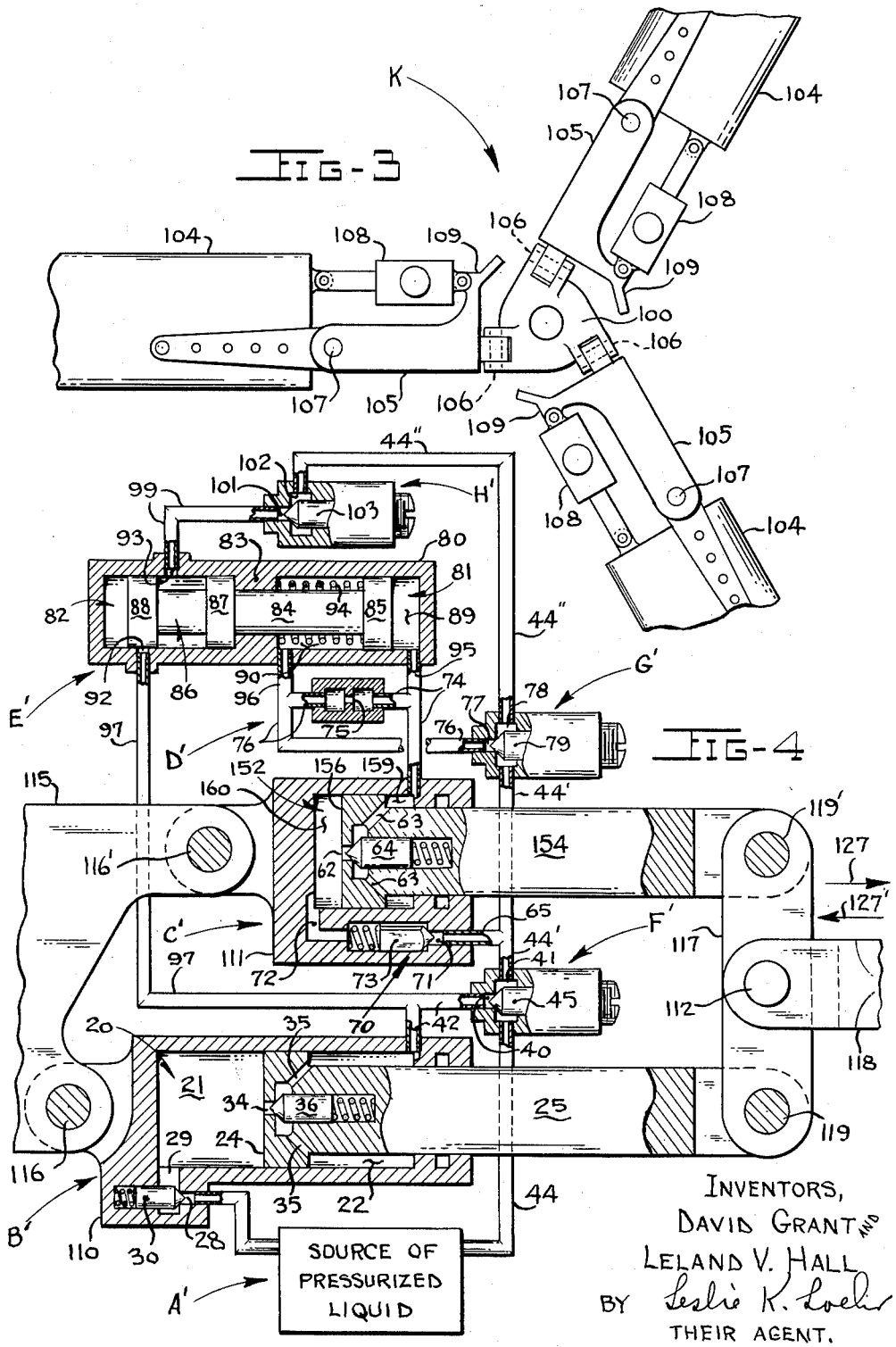

United States Patent Office 3,144,082
Patented Aug. 11, 1964

3,144,082
VIBRATION DAMPING MECHANISM
David Grant, Los Angeles, and Leland V. Hall, Culver City, Calif., assignors to Hughes Tool Company, Houston, Tex., a corporation of Delaware
Filed Nov. 13, 1962, Ser. No. 237,243
14 Claims. (Cl. 170—160.55)

This invention relates to mechanisms for damping vibratory motion of a body member vibrating with respect to another body member, and more particularly to hydraulic mechanisms of this type for use in damping oscillating movements of rotor blades relative to a rotor hub, occurring in the rotation plane during rotation of a fully articulated sustaining rotor of a rotary-wing aircraft.

In the art pertaining to hydraulic damping of vibrating elements, it is common practice to connect a mechanism having variable-volume compartments, such as a piston and cylinder combination, between two relatively movable members; e.g., a rotor blade and a rotor hub, such that vibrating or oscillating movements of one member relative to the other effects relative movements between the piston and the cylinder for producing damping forces which operate to attenuate the vibrating or oscillating movements of the one member.

In mechanisms of this type, it is customary to provide piston and cylinder combinations with openings which are not only arranged as outlets for releasing fluid from the cylinders in response to movements of the pistons, but such openings are made relatively small so as to restrict the outward flow of the hydraulic fluid and thereby produce fluid pressures acting to resist piston movements, which pressures are directly proportional to the square of the flow rate of the fluid passing through the openings and constitute the energy involved in producing the damping forces effecting attenuation of the movements of vibrating or oscillating members.

It is also customary in hydraulic damping mechanisms of the above character, to include pressure relief valves which operate in response to fluid pressures produced in the cylinder such as to provide additional outlets for pressurized fluid when the unit pressure of the fluid in the cylinder exceeds a predetermined magnitude. Thus, any changes in the damping forces produced by such mechanisms result solely from changes in the hydraulic pressures produced in the cylinders without regard for the altered conditions causing the pressure changes. For example, when the oscillation frequency of an oscillating member is constant, hydraulic pressure in the damping cylinder is increased by an increase in the amplitude of the oscillations, when the amplitude of the oscillations is constant, an increase in the frequency of such oscillations also causes an increase in the unit fluid pressure. However, pressure responsive damping mechanisms of the above type are incapable of distinguishing between the conditions causing the pressure changes in the damping cylinder since they respond in the same manner to all conditions effecting changes in the damping cylinder pressures.

To overcome the above-stated incapability, the present invention contemplates a hydraulic damping mechanism of the above general character wherein the magnitude of the damping forces applied to an oscillating member are not only controlled in response to hydraulic pressures produced in the energy-dissipating device or damping cylinder, but are also controlled in response to the oscillation frequency of the oscillating member movements as an independent function of these movements.

Accordingly, it is a primary object of this invention to provide a mechanism for damping or attenuating the oscillating movements of an oscillating body member such that the magnitude of the damping forces produced by the mechanism is controlled by the oscillation frequency of said oscillating movements to the extent that the damping forces are inversely affected by the oscillating frequency of said movements.

It is another object to provide a damping mechanism of the above character wherein the damping forces are reduced when the oscillation frequency exceeds a preselected magnitude and are increased when said frequency falls below a preselected magnitude.

It is another object to provide a hydraulic damping mechanism of the type including fluid-containing variable-volume compartments for attenuating oscillating movements of a rotor blade relative to the rotor hub of an aircraft sustaining rotor such that the magnitude of the damping forces produced by the mechanism is controlled by hydraulic pressures produced in the variable-volume compartments and by the oscillation frequency of the oscillating blade movements as an independent function of said movements.

It is a further object to provide a hydraulic damping mechanism of the above character in which the control effected by the oscillation frequency results from independent means functioning in response to the oscillation frequency of oscillating blade movements such that a decrease in damping forces is effected at oscillation frequencies above a preselected magnitude and such that an increase in the damping forces is effected at frequencies below said preselected magnitude.

It is an additional object to provide a hydraulic damping mechanism of the above character in which the independent means is characterized by a relief valve for releasing pressurized fluid from at least one of the variable-volume compartments, and by means responsive solely to the oscillation frequency of the oscillating blade movements for effecting actuation of the relief valve.

These and other objects and advantages will become more apparent from the following description considered in connection with the accompanying drawings which illustrate the novel features of this invention for descriptive purposes only and which are not intended as a definition of the limits thereof.

In the drawing:

FIG. 1 is a sectional view schematically illustrating a damping mechanism embodying the features of this invention;

FIG. 2 is a sectional view showing a portion of FIG. 1;

FIG. 3 is a fragmentary plan view schematically illustrating a fully articulated rotor for rotary wing aircraft, which incorporates a plurality of damping mechanisms of the character shown in FIG. 1; and FIG. 4 is a sectional view schematically illustrating a modification of the damping mechanism shown in FIG. 1.

In general, the damping mechanism shown in FIG. 1 comprises a source of pressurized liquid A, a primary pump B, a secondary pump C, a resistance element D, a control valve E, and pressure relief valves F, G, and H. With the exception of liquid source A and primary pump B, the above-named elements are, for the sake of simplicity, shown as separated components fluid-conductively interconnected in functional relationship. However, it is to be clearly understood that the showing in FIG. 1 is not intended as a limitation on the scope of the invention, since it is apparent to one skilled in the art, that the above-named elements may be combined as a matter of choice, into one or more unitized structures to meet specific requirements.

According to FIG. 1, the pressurized-liquid source A and primary pump B are combined as a single structure in which a housing 10 is constructed to not only include a chamber 11 and a hydraulic accumulator 12 for pressurizing liquid in the chamber so as to constitute the source of pressurized liquid, but to also include a cylinder 20 which is divided into variable-volume compartments 21 and 22 by a piston 24 slidably mounted in the cylinder 20 so as to constitute a variable-stroke positive-displacement pump.

Since pump B is intended for connection between relatively movable body members, housing 10 is provided with lugs 13–13' connected to lug 14 of a stationary member 15 by a pin 16, and piston 24 is provided with a piston rod 25 having lugs 26–26' connected to lug 17 of a movable member 18 by a pin 19 such that vibrating or oscillating movements of member 18 occurring as indicated by arrows 27–27', with respect to member 15 cause reciprocating movements of piston 24 in cylinder 20 which, in turn, cause reciprocal variations in the volumes of compartments 21 and 22.

A port 28 through one wall of chamber 11 communicating with an opening 29 in the wall of cylinder 20 provides a passageway connecting chamber 11 of source A and compartment 21 of pump B. A check valve element 30 provided for effecting a closed condition of port 28 with respect to liquid in compartment 21 is responsive to liquid pressure in chamber 11 for opening port 28 such that liquid flows from the chamber into compartment 21 while the unit pressure of liquid in the chamber exceeds the unit pressure of liquid in the compartment. Similarly, a port 34 through the front face of piston 24 communicating with openings 35 extending through the rod side of the piston provides passageways through said piston connecting compartments 21 and 22 of cylinder 20. A check valve element 36 provided so as to effect a closed condition of port 34 and the passageways through the piston with respect to liquid in compartment 22 is made responsive to liquid pressure in compartment 21 for opening port 34 such that liquid flows from compartment 21 into compartment 22 while the unit pressure of liquid in compartment 21 exceeds the unit pressure of liquid in compartment 22.

A liquid-conducting passageway connecting cylinder compartment 22 of pump B with liquid source A, embraces inlet port 40 and outlet chamber 41 of relief valve F, which port and chamber are respectively connected to compartment 22 by a duct 42 and to chamber 11 of the liquid source by a duct 44. It should be noted that relief valve F includes a valve element 45 having an adjustable spring bias, which is not only arranged for effecting a closed condition of inlet port 40 and its related passageway with respect to liquid in chamber 11 and duct 44, but it is also made responsive to liquid pressure in compartment 22 for opening the passageway embracing port 40 such that liquid flows from compartment 22 into chamber 11 of source A while the unit pressure of any liquid in said compartment exceeds a preselected magnitude determined by the spring bias acting on valve element 45.

The secondary pump C is a combined reciprocating hydraulic motor and positive displacement pump comprising a housing 50 having axially aligned motor and pump cylinders 51 and 52 separated by a wall 53 slidably receiving a piston rod 54 interconnecting motor and pump pistons 55 and 56 slidably received by their respective cylinders such that motor piston 55 divides motor cylinder 51 into variable-volume compartments 57–58 and such that pump piston 56 divides pump cylinder 52 into similar variable-volume compartments 59–60, whereby reciprocating movement of the motor piston causes like movement of the pump piston, which in turn, causes reciprocal volume variations in the variable-volume compartments of the motor and pump cylinders.

Reciprocating movement of motor piston 55 is effected by liquid pressure produced during the operation of primary pump B as hereinafter explained, which pressure is conducted from compartments 21–22 of pump cylinder 20 into compartments 57–58 of secondary pump C by a duct 61 interconnecting compartments 21 and 57, and by ducts 42 and 43 interconnecting compartments 22 and 58.

A port 62 through the front face of pump piston 56 communicating with openings 63 extending through the rod side of the piston provides passageways through said piston, which connect compartments 59 and 60 of pump cylinder 52. A check valve element 64 normally effecting a closed condition of port 62 and the passageways through piston 56 with respect to liquid in compartment 59, is so constructed as to be responsive to liquid pressure in compartment 60 for opening port 62 such that liquid flows from compartment 60 into compartment 59 while the unit pressure of liquid in compartment 60 exceeds the unit pressure of liquid in compartment 59.

A liquid-conducting passageway between source A and compartment 60 of pump cylinder 52 is provided through duct 44, chamber 41 of relief valve F, ducts 44'–65, and a check valve 70 having an inlet port 71 communicating with duct 65 and an outlet opening 72 through an end wall of cylinder 52. Valve 70 includes a valve element 73 normally effecting a closed condition of port 71 with respect to liquid in compartment 60, which element is made responsive to liquid pressure in ducts 65–44'–44 and chamber 11 of source A for opening port 71 such that liquid flows from chamber 11 into compartment 60 while the unit pressure of liquid in chamber 11 exceeds the unit pressure of liquid in compartment 60.

Since pump C is a positive displacement pump, liquid from source A entering compartment 60 of pump cylinder 52 via ducts 44–44'–65 and check valve 70 is returned to duct 44' from compartment 59 of the pump cylinder through a circulation passageway embracing resistance element D and relief valve G which passageway comprises a duct 74, orifice 75 in element D, a duct 76, and an inlet port 77 and outlet chamber 78 in valve G, of which the chamber is connected to duct 44'. Relief valve G being similar to valve F, includes a valve element 79 having an adjustable spring bias, which is not only arranged for effecting a closed condition of inlet port 77 with respect to liquid in chamber 78 and duct 44', but it is also made responsive to liquid pressure in duct 76 for opening the circulation passageway such that liquid flowing from pump cylinder compartment 59 through resistance element orifice 75 into duct 76 is returned to duct 44' and source A while the unit pressure of the liquid in duct 76 exceeds a preselected magnitude determined by the spring bias acting on relief valve element 79.

Control valve E is shown as a spool-type hydraulic valve provided with piston-cylinder actuator for moving the valve spool to desired positions for producing sought results. Valve E comprises a housing 80 having axially aligned actuator and valve cylinders 81 and 82 separated by a wall 83 slidably receiving a piston rod 84 connecting an actuator piston 85 to a valve spool 86 having lands 87 and 88. The piston and spool are slidably received by their respective cylinders such that piston 85 divides actuator cylinder 81 into variable compartments 89 and 90, and such that movement of the piston causes corresponding movement of the valve spool.

The function of spool 86 is to affect the liquid conducting relationship between inlet and outlet ports 92 and 93 provided in the wall of cylinder 82 such that in one position as shown in FIG. 1, land 88 of spool 86 is effective for blocking inlet port 92 with respect to outlet port 93 so as to prevent any flow of liquid therebetween, and such that in a second position as shown in FIG. 2, land 88 disposed to the right of port 92 is effective for establishing a free-flowing liquid-conducting connection between ports 92 and 93. As indicated in FIG. 1, spool 86 is normally biased to the position blocking inlet port 92 by a spring 94 acting against piston 85 and wall 83, but is moved to the position shown in FIG. 2 by piston 85 in response to pressurized liquid taken from each side of resistance element D and conducted to compartments 89 and 90 by ducts 95 and 96 respectively interconnecting said compartments with ducts 74 and 76 in the circulation passageway previously identified in the above description of secondary pump C.

According to FIG. 1, a second liquid-conducting passageway embracing control valve E and relief valve H, is provided between compartment 22 of primary pump cylinder 20 and chamber 11 of source A, which passageway comprises ducts 42 and 97, inlet and outlet ports 92 and 93 in the wall of control valve cylinder 82, a duct 99, an inlet port 101 and outlet chamber 102 of relief valve H, and duct 44″. Relief valve H being similar to relief valves F and G includes a valve element 103 having an adjustable spring bias, which is not only arranged for effecting a closed condition of inlet port 101 with respect to liquid in chamber 102 and duct 44″, but it is also made responsive to liquid pressure in duct 99 for opening the second passageway such that liquid flows through valve H while the unit pressure of any liquid in duct 99 exceeds a preselected magnitude determined by the spring bias acting on valve element 103. It should be noted that chambers 41, 78 and 102 of relief valves F, G and H, and ducts 44, 44′ and 44″ are arranged as a common passageway so as to provide a free flow of liquid between the relief valve chambers and chamber 11 of source A.

For the purpose of describing the operation of the damping mechanism shown in FIG. 1, let it be assumed that chamber 11 and accumulator 12 have been charged with hydraulic liquid under pressure through a suitable charging valve 105 such that: (a) compartments 21 and 22 of primary pump B have been filled with liquid from chamber 11 of source A in response to operation of valve elements 30 and 36; (b) ducts 61, 42, 43, 97 and compartments 57 and 58 in motor cylinder 51 of secondary pump C have been filled with liquid from primary pump compartments 21 and 22; (c) ducts 44, 44′, 65, 44″, chambers 41, 78, 102 of relief valves F, G, H have been filled with liquid from chamber 11; (d) compartments 60 and 59 of secondary pump C have been filled with liquid in response to the operation of valve elements 73 and 64; and (e) ducts 74, 76, 95, 96, resistance element D, and compartments 89 and 90 of control valve actuator cylinder 81 have been filled with liquid from compartment 59 of secondary pump C.

It was previously mentioned that any reciprocating motion of movable member 18 relative to stationary member 15, as indicated by arrows 27 and 27′, will cause a corresponding movement of piston 24; therefore, once all chambers, ducts and compartment of the damping mechanism are filled with liquid, any movement of piston 24 in primary pump cylinder 20 is resisted by liquid in compartments 21 and 22. For instance, when member 18 applies a force to piston 24 in the direction of arrow 27, the liquid in compartment 22 is pressurized in proportion to the force applied, which, in turn, pressurizes the liquid in ducts 42, 43, 97 and in compartment 58 of the secondary pump motor cylinder 51. Thus, pressure is not only applied to valve element 45 of relief valve F, but it is also applied to motor piston 55 via compartment 58 of pump C, tending to move the piston in the direction of arrow 23. However, because of the incompressibility of the liquid in the cylinder compartments of the primary pump and in motor cylinder compartments of the secondary pump, piston 24 does not move until the unit pressure of the liquid in compartment 22 exceeds the spring bias setting of relief valve F. When this occurs, that is, when valve element 45 responds to the pressure produced in compartment 22 such that port 40 is open to chamber 41, liquid flows from said compartment 22 into chamber 11 of source A through ducts 42, 44. Displacement of piston 24 in the direction of arrow 27 increases the volume of compartment 21 such that liquid flows into said compartment from motor compartment 57 under pressure resulting from the response of motor piston 55 to the liquid pressure being produced in pump compartment 22 by piston 24. Moreover, when the volume increase in compartment 21 exceeds the volume of liquid expelled from motor compartment 57, check valve element 30 responds to the pressurized liquid in source A such that liquid flows from chamber 11 through port 28 and opening 29 into compartment 21.

When member 18 reverses its direction of movement and applies a force to piston 24 in the direction of arrow 27′, liquid in compartment 21 is subjected to an increase in pressure proportional to the force applied. In this instance, valve element 36 responds to the increased pressure in compartment 21 such that port 34 and openings 35 constitute a passageway through the piston connecting the compartments 21 and 22. Hence, the liquid in both compartments is not only subjected to increased pressure by the force applied to piston 24, but the same is true with respect to the liquid in duct 61 and compartment 57 of motor cylinder 51, and with respect to the liquid in ducts 42, 43, 97 and compartment 58 of said motor cylinder. However, any appreciable movement of piston 24 is precluded because of the incompressibility of liquid, until the increased pressure exceeds the spring bias setting of relief valve F. When this condition occurs, valve element 45 responds to the increased pressure, piston 24 moves in the direction indicated by arrow 27′, and liquid flows from compartment 21 through piston 24 into compartment 22 at a rate exceeding the rate of increase in the volume of compartment 22 because of the difference between the areas of piston 24 which are exposed to compartments 21 and 22. The excess liquid entering compartment 22 is returned to chamber 11 of source A via duct 42, port 40 and chamber 41 of valve F, and duct 44.

As previously indicated, movement of piston 24 in the direction of arrow 27′ supplies liquid at increased pressure to compartments 57 and 58 of motor cylinder 51. It is noted, however, that the effective area of piston 55 exposed to compartment 57 is made larger than the effective area exposed to compartment 58. Therefore, since the unit pressure of the liquid in both compartments is substantially the same, the pressurized liquid supplied to compartment 57 results in the movement of piston 55 in the direction of arrow 23′. It should be noted that the volumes of motor cylinder compartments 57 and 58 are made relatively small in comparison with the volumes of primary pump cylinder compartments 21 and 22. Hence, only small quantities of liquid entering the motor cylinder compartments from said pump cylinder compartments are required to actuate the secondary pump motor. This arrangement provides a functional relationship between the primary pump and the motor of the secondary pump such that, during operation of primary pump B by member 18, relatively short strokes of pump piston 24 and/or small portions at the beginning of longer strokes are adequate for effecting optimum reciprocation of the motor piston 55 of the secondary pump.

Primary pump B is preferably constructed such that, when piston 24 moves in the direction of arrow 27′, the volume of liquid displaced from compartment 21 exceeds the volume increase in compartment 22 by an amount substantially equal to the magnitude of said volume increase. Thus, the output of pump B is constant for a constant oscillation frequency of a constant amplitude, and is variable in response and proportion to variations in the frequency and/or the amplitude of the oscillations. Moreover, the unit pressure magnitude of the output from pump B is controlled by the spring bias setting of relief valve F. Therefore, since the primary pump is driven by movable member 18, it is now apparent that the maximum amount of kinetic energy in member 18 which is dissipated by pump B, is a function determined by the setting of relief valve F.

As above described, motor piston 55 is connected to pump piston 56 of secondary pump C by piston rod 54; hence, reciprocating movement of piston 55 in cylinder 51 causes corresponding movement of piston 56 in pump cylinder 52. Thus, when piston 55 moves in the direction indicated by arrow 23, liquid in compartment 59 of cylinder 52 is subjected to an increase in pressure by piston 56, which pressure is proportional to the forces acting on motor piston 55, and when the unit pressure of the liquid in compartment 59 exceeds the spring bias setting of relief valve G, valve element 79 responds to open the valve such that liquid flows from compartment 59 into duct 44' via duct 74, orifice 75 of resistance element D, duct 76, port 77 and chamber 78 of said relief valve. Simultaneously with the opening of relief valve G, valve element 73 of check valve 70 responds to the pressurized liquid in duct 44' such that pressurized liquid is added to compartment 60 from duct 44' in proportion to the changes in the volume of said compartment resulting from the movement of piston 56.

A reversal of the movement of piston 55 to the direction indicated by arrow 23' causes an increase in the pressure of the liquid in compartment 60 of secondary pump cylinder 52, which pressure increase causes movement of valve element 64 such that port 62 and openings 63 constitute passageways through piston 56 connecting compartments 60 and 59. Hence, liquid in both compartments is not only subjected to an increase in pressure by piston 56, proportional to the forces acting on motor piston 55, but, because of the difference in the areas of piston 56 which are exposed to compartments 59 and 60, movement of piston 56 in the direction of arrow 23' causes liquid to flow from compartment 60 through the piston at a volume rate exceeding the rate of increase in the volume of compartment 59. When the unit pressure of the liquid in compartments 60 and 59 exceeds the setting of relief valve G, the above-identified liquid-volume-difference returns to the common passageway connected to source A through the circulation passageway comprising duct 74, orifice 75 of resistance element D, duct 76, port 77 and chamber 78 of relief valve G, and duct 44'.

Attention is directed to the fact that secondary pump C is preferably constructed such that, when piston 56 moves in the direction of arrow 23', the volume of liquid displaced from compartment 60 exceeds the volume increase in compartment 59 by an amount substantially equal to the magnitude of said volume increase. Thus, the output of pump C is constant for a constant oscillation frequency, and is variable in response and proportion to variations in the frequency of the oscillations.

Because of the structural and functional relationships between primary pump B and the motor portion of secondary pump C, it becomes obvious that motor piston 55 not only operates in response to liquid pressures produced in compartments 21 and 22 of primary pump cylinder 20 by piston 24, but it also operates in synchronism with the operation of the primary pump such that a preselected minimum displacement of the primary pump piston 24 in cylinder 20 effects a preselected maximum displacement of piston 56 in cylinder 52 of the secondary pump. In other words, secondary pump C operates in synchronism with primary pump B at all oscillation frequencies of movable member 18 independently of oscillation amplitudes above a preselected minimum.

It was indicated above that the output of secondary pump C is a function of its oscillation frequency; hence it follows, that the output of pump C is also a function of the oscillation frequency of primary pump B, and that the flow-rate of this output as it circulates in the circulation passageway, is a measure of the oscillation frequency of movable member 18. In other words, the rate at which liquid flows from duct 44' and returns thereto, via duct 65, check valve 70, compartments, 60 and 59 of pump cylinder 52, duct 74, resistance element D, duct 76, and relief valve G is, at any instant, an accurate indication of the oscillation frequency of primary pump B. Therefore, the pressure difference in ducts 74 and 76 resulting from the flow of liquid through restrictive orifice 75 of resistance element D is, at any instant, an accurate measure of the oscillation frequency of movable member 18. This pressure difference in ducts 74 and 76 of the circulation passageway is an important feature of the invention, which is employed by control valve E to provide, between compartment 22 and source A, a pressure-reducing passageway through relief valve H that by-passes relief valve F for effecting a decrease in the pressure produced in the primary pump B and a consequent reduction in the forces acting to damp or attenuate oscillating or vibratory motion of member 18.

Looking at the drawing, it should be noted that the different liquid pressures occurring in ducts 74 and 76 are respectively conducted by ducts 95 and 96 to compartments 89 and 90 in actuator cylinder 81 of control valve E, and that actuator piston 85 is so constructed that the piston face exposed to compartment 89 is provided with a larger area than the effective piston area exposed to compartment 90. These areas are so proportioned that, when a preselected difference occurs between the pressures of the liquid in compartments 89 and 90, piston 85 is moved in the direction of arrow 98 by the pressure of the liquid acting against the larger piston face. Stated differently, the pressure of the liquid in compartment 89 acting against the larger face of piston 85 overpowers the combined pressure of spring 94 and the liquid pressure acting against the smaller face of the piston in compartment 90. Thus, when movable member 18 oscillates or vibrates at a frequency such that secondary pump C causes liquid to flow through resistance element D of the circulation passageway at a rate adequate to produce the preselected difference between the pressures in ducts 74 and 76 and in compartments 89 and 90 of actuator cylinder 81, actuator piston 85 is moved in the direction of arrow 98 causing a corresponding movement of valve spool 86 such that land 88, in moving to the right (see FIG. 2), establishes a free-flowing passageway comprising ports 92 and 93 in the wall of cylinder 82, ducts 42, 97 and 99 connecting compartment 22 of primary pump cylinder 20 to the port 101 of relief valve H.

Since the purpose of relief valve H is to determine the reduced or minimum level of the effective pressure in compartment 22 of primary pump cylinder 20, the setting of the spring bias is such that valve H is open to all pressures in compartment 22 above a preselected minimum level. Thus, when control valve E has responded to the difference between the pressures in ducts 74 and 76, and has established a passageway between compartment 22 and port 101 of relief valve H, valve element 103 being subjected to the liquid pressure in said compartment, responds so as to open valve H (see FIG. 2) and complete the pressure-reducing passageway between compartment 22 and chamber 11 of source A, thereby providing a passageway by-passing relief valve F.

From the foregoing description of the structural and functional characteristics of the mechanism shown in FIGS. 1 and 2, it should now be clearly understood: that (1) source A and primary pump B are effective for damping or attenuating vibratory or oscillatory movements of relatively movable members 15 and 18 by dissipating energies involved in such movements through conversion to hydraulic pressure; that (2) the magnitude of the attenuating or damping force resulting from the hydraulic pressure is controlled such that for oscillation frequencies below a preselected number of cycles per second, the force is maximum as determined by the setting of relief valve F, and above a preselected number of cycles per second the force is reduced to a minimum by control valve E and relief valve H; and that (3) the change from high damping force to low damping force and vice versa is controlled by the oscillation-frequency sensitive combination comprising secondary pump C, restrictive element D, and the circulation passageway embracing relief valve G.

Utility of the damping mechanism shown in FIGS. 1 and 2 is clearly indicated in FIG. 3 where a fully articulated aircraft sustaining rotor identified by reference letter K, is schematically illustrated. Rotor K includes a rotor hub 100 and a plurality of thrust-producing rotor blades 104 radially connected to the hub by suitable connecting members 105 for rotation in a circular path around the axis of the hub. Members 105 are pivotally attached to the hub and blades by horizontal and vertical hinge pins 106 and 107 such that flapping movements and lag-lead movements of the blade relative to the hub can occur across and in the circular path during hub rotation.

Although the pivotal blade movements permitted by hinge pins 106 and 107 are essential to the successful operation of rotor K, serious consequences can result from lag-lead movements of the blades relative to the hub unless these movements are controlled by suitable damping means during operation of an aircraft equipped with a rotor such as rotor K. This problem is well-known in the art pertaining to helicopters and other rotary wing aircraft, and has been treated in many different ways.

In seeking a successful solution to the problem, it has been observed that, when lag-lead movements occur at frequencies within a certain range or below a certain number of cycles per second, the force applied to damp or attenuate the movements can be of a relatively high magnitude, but for frequencies above that certain range or above that certain number of cycles per second, the force applied to damp blade movements should be reduced to avoid the occurrence of serious vibrations in the whole aircraft. Therefore, since it is the purpose of the present invention to provide a damping mechanism having the ability to produce a high-level damping force through a preselected range of oscillation frequencies, and the ability to reduce such damping force to a preselected lower level at frequencies above the preselected range, it is obvious to employ the damping mechanism of FIGS. 1 and 2 in aircraft sustaining rotor K of FIG. 3 where reference numeral 108 identifies said mechanism which in this instance, is arranged as a unitary structure.

Since the lag-lead movements of blades 104 occur about vertical hinge pins 107, damping mechanisms 108 are connected between the blades and arms 109 of connecting members 105, which arms are, in effect, connected to the hub so as to be stationary with respect to movements of the blades about the vertical hinge pins. The means employed for effecting the connections of damping mechanisms 108 between blades 104 and arms 109 are similar in character to the pins and lugs employed for connecting primary pump B between movable member 18 and stationary member 15, and the operation of mechanisms 108 in response to lag-lead movements of blades 104 about hinge pins 107 is the same as the operation of the damping mechanism of FIGS. 1 and 2 in response to movements of movable member 18 relative to stationary member 15.

The modification shown in FIG. 4 comprises a source of pressurized liquid A', a primary pump B', a secondary pump C', a resistance element D', a control valve E', and pressure relief valves F', G', and H'. These components are similar in construction and operation to those in FIG. 1, with the exception of secondary pump C' which is mechanically connected to primary pump B' and movable member 118 as hereinafter explained.

Housing 110 of pump B', pivotally connected to a stationary member 115 by a pin 116, includes a cylinder 20 which is divided into variable-volume compartments 21 and 22 by a piston 24 slidably mounted in the cylinder so as to constitute a variable-stroke positive-displacement pump. Secondary pump C' is provided with a housing 111 pivotally connected to stationary member 115 by a pin 116', which housing includes a pump cylinder 152 slidably receiving a piston 156 such that the cylinder is divided into variable volume compartments 159 and 160 so as to constitute a positive displacement pump.

Piston 24 of pump B' and piston 156 of pump C' are respectively provided with piston rods 25 and 154 both of which are pivotally connected to a movable member 118 through an equalizing member 117 by pivot pins 112, 119 and 119' such that movements of member 118 in the directions indicated by arrows 127 and 127' cause corresponding movements of pistons 24 and 156 in cylinders 20 and 152 of the primary and secondary pumps.

Because of the similarity between the components employed in FIGS. 1 and 4, the structural description of resistance element D, control valve E, and relief valves F, G, and H in FIG. 1 applies equally well to resistance element D', control valve E', and relief valves F', G', and H' shown in FIG. 4; hence, the reference numerals employed in FIG. 1 are used to designate the same parts in FIG. 4.

Let it be assumed for purposes of description, that source A' is charged with hydraulic liquid under pressure such that: (a) compartments 21 and 22 of primary pump B' have been filled with liquid from source A' in response to operation of valve elements 30 and 36; (b) ducts 42 and 97 have been filled with liquid from primary pump compartment 22; (c) ducts 44, 44', 65, 44", chambers 41, 78, 102 of relief valves F', G', H' have been filled with liquid from source A'; (d) compartments 160 and 159 of secondary pump C' have been filled with liquid in response to the operation of valve elements 73 and 64; and (e) ducts 74, 95, 96, resistance element D', and compartments 89 and 90 of control valve actuator cylinder 81 have been filled with liquid from compartment 159 of secondary pump C'.

Turning for a moment to the effect of equalizing member 117: it is to be understood that the amount of liquid required to move valve spool 86 of control valve E' from the position shown in FIG. 4 to a position similar to that shown in FIG. 2 is made relatively small, thus the displacement of piston 156 in pump C' is also small; hence, the stroke of piston 156 is short in comparison with the full stroke of piston 24 in the primary pump. Moreover, the unit pressures of the liquid required to actuate control valve E' are of a relatively low magnitude; hence, the liquid pressures produced in compartments 159 and 160 of secondary pump cylinder 152 are also of a low magnitude in contrast to the pressures produced in compartments 21 and 22 of primary pump cylinder 20. Therefore, when movable member 118 oscillates or vibrates as indicated by arrows 127 and 127', the resistance offered by piston 156 of the secondary pump to movements of member 118 are considerably less than the resistance offered by piston 20 of the primary pump. Under these conditions, piston 156 moves first to the end of its stroke such that pin 119' constitutes a fulcrum for equalizing member 117 for moving piston 24 of the primary pump.

When pressures produced by primary pump B', in the manner previously described for pump B in FIG. 1, exceed the setting of relief valve F' liquid is returned to source A' via duct 42, port 40 and chamber 41 of valve F, and duct 44. Moreover, when the oscillation frequency of member 118 is such that pump C' causes liquid to flow through resistance element D' at a rate adequate to produce a predetermined difference between the pressures in ducts 74 and 96, and in compartments 89 and 90 of actuator cylinder 81, actuator piston 85 is moved to the left in FIG. 4, to thereby establish a free-flowing passageway comprising ports 92 and 93 in the wall of cylinder 82, ducts 42, 97, and 99 connecting compartment 22 of primary pump cylinder 20 to the port 101 of relief valve H'. When this occurs, valve H' being set to respond at a lower pressure level than valve F', operates to provide a passageway between compartment 22 and source A', which bypasses valve F' and thereby reduces the pressures produced in compartment 22 to a lower level.

Except for the structural differences whereby secondary pump C' is connected mechanically instead of hydraulically to primary pump B' and movable member 118, it should now be apparent that the damping mechanisms shown in FIGS. 1 and 4 are similar in that (1) sources A and A', and primary pumps B and B' are effective for damping or attenuating vibratory or oscillatory movements of members 18 and 118 by dissipating the energies involved in such movements through conversion to hydraulic pressures; that (2) the magnitudes of the attenuating or damping forces applied to members 18 and 118 are controlled such that for oscillation frequencies below a preselected number of cycles per second, the forces are maximum as determined by the settings of relief valves F and F', and above a preselected number of cycles per second, the forces are reduced to a minimum by control valves E and E' operating in conjunction with relief valves H and H'; and that (3) the changes from high damping forces to low damping forces and vice versa are controlled by the frequency-sensitive combination comprising secondary pumps C and C', resistive elements D and D', and the circulation passageways embracing relief valves G and G'.

What is claimed as new is:

1. An aircraft sustaining rotor including a rotor hub, a thrust-producing rotor blade disposed in a generally radial position with respect to the axis of the hub, hinging means interconnecting the blade and hub such that rotation of the hub causes the blade to travel in a circular path around the hub axis and such that oscillating movements of the blade relative to the hub can occur in the circular path during hub rotation, and a damping mechanism of a character such that any oscillating blade movements occurring during hub rotation produce damping forces effecting attenuation of said oscillating blade movements and such that said damping forces are inversely affected by the oscillating frequency of said oscillating movements, said damping mechanism comprising:

a source of pressurized liquid;

energy-dissipating means characterized by first and second liquid-filled variable-volume compartments, said means being interconnected between the rotor hub and rotor blade such that oscillating blade movements cause compartment volume variations effecting pressurization of the liquid in said compartments;

first liquid-conducting means responsive to the unit pressure of the liquid in said source for conducting liquid from said source into the first compartment of the energy-dissipating means when the unit pressure of the source liquid exceeds the unit pressure of the first compartment liquid;

second liquid-conducting means responsive to the unit pressure of the liquid in said first compartment for conducting liquid from said first compartment into the second compartment of the energy-dissipating means when the unit pressure of the first compartment liquid exceeds the unit pressure of the second compartment liquid;

third liquid-conducting means for conducting liquid from said second compartment into the source of liquid when the unit pressure of the second compartment liquid attains a preselected maximum magnitude; and means responsive to oscillating blade movements for by-passing said third means for conducting liquid from the second compartment of the energy-dissipating means into the source of liquid at unit pressures below said maximum magnitude and above a preselected minimum magnitude such that liquid pressurization in said energy-dissipating means is reduced when the oscillation frequency of said oscillating blade movements exceeds a preselected frequency magnitude.

2. The combination according to claim 1 in which the by-passing means comprises:

a by-pass duct fluid-conductively connected the second compartment of the energy dissipating means to the source of liquid;

a first valve normally blocking the by-pass duct with respect to pressurized liquid in the liquid source but arranged to open said duct in response to pressurized liquid in the second compartment when the unit pressure of the second compartment liquid exceeds the preselected minimum magnitude;

a control valve normally blocking the by-pass duct between the second compartment and the first valve, said control valve being characterized by an actuator responsive to liquid pressure of a preselected pressure magnitude for causing said valve to open said by-pass duct;

a reciprocating pump arranged so as to circulate source liquid through a liquid-circulation passageway interconnecting the pump and the source of liquid, said pump being associated with the energy-dissipating means and the rotor blade such that oscillating movements of the blade during rotor rotation are also effective for actuating said pump such that the flow rate of liquid circulation through the liquid-circulation passageway is directly proportional to the oscillation frequency of the oscillating blade movements; and an element having a restrictive orifice associated with the control valve actuator and the liquid circulation passageway such that liquid circulating through said passageway at a preselected flow rate effects production of the liquid pressure having the preselected pressure magnitude required for actuating the control valve to open the by-pass duct, said restrictive orifice being disposed in the liquid-circulation passageway between the outlet of the reciprocating pump and the source of liquid.

3. The combination according to claim 2 in which the reciprocating pump is drivenly connected to a liquid-pressure motor fluid-conductively connected to the first and second compartments of the energy-dissipating means; said motor including a double-acting piston reciprocably responsive to liquid pressures in said first and second compartments resulting from oscillating movements of the rotor blade such that the reciprocation frequency of the reciprocating double-acting piston equals the oscillation frequency of the oscillating blade movements.

4. In an apparatus having first and second body members interconnected such that oscillating movements of one body member can occur with respect to the other body member, and a mechanism associated with said body members for damping the oscillating movements according to the oscillation frequency of said oscillating movements; said mechanism comprising:

a source of pressurized liquid;

energy-dissipating means characterized by first and second liquid-filled variable-volume compartments, said means being interconnected between the first and second body members such that oscillating movements of one body member occurring with respect to the other body member causes compartment volume variations effecting pressurization of the liquid in said compartments;

first liquid-conducting means responsive to the unit pressure of the liquid in said source for conducting liquid from said source into the first compartment of the energy-dissipating means when the unit pressure of the source liquid exceeds the unit pressure of the first compartment liquid;

second liquid-conducting means responsive to the unit pressure of the liquid in said first compartment for conducting liquid from said first compartment into the second compartment of the energy-dissipating means when the unit pressure of the first compartment liquid exceeds the unit pressure of the second compartment liquid;

third liquid-conducting means for conducting liquid from said second compartment into the source of pressurized liquid when the unit pressure of the second compartment liquid attains a preselected maximum magnitude; and means responsive to oscillating movements of one body member relative to the other body member for by-passing said third means for conducting liquid from the second compartment of the energy-dissipating means into the source of liquid at unit pressures below said maximum magnitude and above a preselected minimum magnitude such that liquid pressurization effected in said energy-dissipating means is reduced when the oscillation frequency of said oscillating movements of said one body member exceeds a preselected frequency magnitude.

5. The combination according to claim 4 in which the by-passing means comprises:

a by-pass duct fluid-conductively connecting the second compartment of the energy-dissipating means to the source of pressurized liquid;

a first valve normally blocking the by-pass duct with respect to pressurized liquid in the source but arranged to open said duct in response to pressurized liquid in the second compartment when the unit pressure of the second compartment liquid exceeds the preselected minimum magnitude;

a control valve normally blocking the by-pass duct between the second compartment and the first valve, said control valve being characterized by an actuator responsive to liquid-pressure of a preselected pressure magnitude for causing said control valve to open said by-pass duct;

a reciprocating pump arranged so as to circulate source liquid through a liquid-circulation passageway interconnecting the pump and the source of liquid, said pump being associated with energy-dissipating means and the first and second body members such that oscillating movements of the one body member relative to the other body member is also effective for acutating said pump such that the flow rate of liquid circulation through the liquid circulation passageway is directly proportional to the oscillation frequency of the oscillating movements of said one body member; and an element having a restrictive orifice associated with the control valve actuator and the liquid circulation passageway such that liquid circulating through said passageway at a preselected flow rate effects production of the liquid pressure having the preselected pressure magnitude for actuating the control valve to open the by-pass duct, said element being arranged such that the restrictive orifice is disposed in the liquid circulation passageway between the outlet of the reciprocating pump and the source of liquid.

6. The combination according to claim 5 in which the reciprocating pump is drivenly connected to a liquid-pressure motor fluid-conductively connected to the first and second compartments of the energy-dissipating means, said motor having a double-acting piston reciprocably responsive to liquid pressures produced in said first and second compartments by oscillating movements of the one body member such that the reciprocation frequency of the reciprocating double-acting piston equals the oscillation frequency of the oscillating movements of the body member.

7. An aircraft sustaining rotor comprising:
a rotor hub;
a thrust-producing rotor blade disposed in a generally radial position with respect to the axis of the hub;
hinging means interconnecting the blade and hub such that rotation of the hub causes the blade to travel in a circular path around the hub axis and such that oscillating movements of the blade relative to the hub can occur in the circular path during hub rotation;

damping means including a first hydraulic pump mechanism coupled between the hub and blade such that oscillating blade movements occurring in the circular path during hub rotation produce fluid-pressure damping forces of a character effecting attenuation of said oscillating blade movements; and control means for controlling the fluid pressure produced by said first pump mechanism to the extent that said fluid-pressure damping forces are inversely affected by the oscillation frequency of the oscillating blade movements during rotation of the sustaining rotor, said control means including a fluid-conducting passageway, and a second hydraulic pump mechanism associated with the first pump mechanism such that said second pump mechanism operates concurrently with the operation of the first pump mechanism and in synchronism with the oscillating blade movements for circulating hydraulic fluid through said passageway such that the rate of fluid circulation is proportional to the oscillation frequency of said oscillating blade movements.

8. The combination according to claim 7 in which the control means is further characterized by fourth means responsive to hydraulic fluid circulated through the fluid-conducting passageway by the second pump mechanism, said fourth means being constructed and arranged such that the rate of fluid circulation is effective for causing a decrease in the fluid-pressure damping forces produced by the first pump mechanism when said circulation rate exceeds a preselected magnitude.

9. The combination according to claim 8 in which the fourth means includes means associated with the fluid-conducting passageway for affecting fluid pressure of the fluid circulated in said passageway by the second hydraulic pump mechanism such that an increase in the circulation rate of said circulating fluid causes an increase in pressure magnitude of said fluid pressure.

10. The combination according to claim 9 in which the fourth means is further characterized by a piston-actuated valve associated with the fluid-conducting passageway and the first hydraulic pump mechanism so as to respond to fluid pressure in said passageway such that said valve is effective for causing a decrease in the fluid-pressure damping forces produced by said first pump mechanism when fluid pressure in said fluid-conducting passageway exceeds a preselected pressure magnitude.

11. An apparatus comprising:
first and second body members interconnected such that oscillating movements of one body member can occur with respect to the other body member;

damping means including a first hydraulic pump mechanism coupled between said body members such that oscillating movements of one body member relative to the other body member produce fluid-pressure damping forces of a character effecting attenuation of said oscillating movements; and control means for controlling the fluid pressure produced by said first pump mechanism to the extent that said fluid-pressure damping forces are inversely affected by the oscillation frequency of the oscillating movements of the one body member, said control means including, a fluid-conducting passageway, and a second hydraulic pump mechanism associated with the first pump mechanism such that said second pump mechanism operates concurrently with the operation of the first pump mechanism and in synchronism with oscillating movements of the one body member for circulating hydraulic fluid through said passageway such that the rate of fluid circulation is proportional to the oscillation frequency of the oscillating movements of said one body member.

12. The combination according to claim 11 in which the control means is further characterized by third means responsive to hydraulic fluid circulated through the fluid-conducting passageway by the second pump mechanism, said third means being constructed and arranged such that the rate of fluid circulation is effective for causing a decrease in the fluid-pressure damping forces produced by the first pump mechanism when said circulation rate exceeds a preselected magnitude.

13. The combination according to claim 12 in which the third means includes means associated with the fluid-conducting passageway for affecting fluid pressure of the fluid circulated in said passageway by the second hydraulic pump mechanism such that an increase in the circulation rate of said circulating fluid effects an increase in pressure magnitude of said fluid pressure.

14. The combination according to claim 13 in which the third means is further characterized by a fluid-pressure-actuated valve associated with the fluid-conducting passageway and the first hydraulic pump mechanism so as to respond to fluid pressure in said passageway such that said valve is effective for causing a decrease in the fluid-pressure damping forces produced by said first pump mechanism when the fluid pressure in said fluid-conducting passageway exceeds a preselected pressure magnitude.

References Cited in the file of this patent

UNITED STATES PATENTS

| | | |
|---|---|---|
| 2,554,774 | Buivid | May 29, 1951 |
| 2,568,214 | Bennett | Sept. 18, 1951 |
| 2,755,871 | Gerstenberger | July 24, 1956 |
| 2,774,553 | Jensen | Dec. 18, 1956 |